United States Patent
Kirchhoff et al.

[15] 3,698,657
[45] Oct. 17, 1972

[54] INERTIA OPERATED LOCKING RETRACTOR

[72] Inventors: Horst-Guenter Kirchhoff, Luettmelland 36, 2 Hamburg 68; Peter Pfabe, Garstedter Weg 210, 2 Hamburg 61; Gerhard Sedlmayr, Koniggratzstrasse 1, 2 Hamburg 52, all of Germany

[22] Filed: Sept. 1, 1970

[21] Appl. No.: 68,744

Related U.S. Application Data

[63] Continuation-in-part of Ser. No. 757,357, Sept. 4, 1968, abandoned.

[52] U.S. Cl. ............................................. 242/107.4
[51] Int. Cl. ............................................. A62b 35/00
[58] Field of Search ....242/107, 107 B, 107.3, 107.4, 242/107.5, 107.6; 280/150 SB; 297/388

[56] References Cited

UNITED STATES PATENTS

| | | |
|---|---|---|
| 2,953,315 | 9/1960 | Lautier et al. ............ 242/107.4 |
| 3,190,579 | 6/1965 | Spouge et al. ........... 242/107.4 |
| 3,214,218 | 10/1965 | Gill .......................... 242/107.4 |
| 3,315,915 | 4/1967 | Vanesse, Jr. ............. 242/107.4 |
| 3,369,768 | 2/1968 | Burns ................... 242/107.3 X |
| 3,416,747 | 12/1968 | Stoffell .................... 242/107.4 |

*Primary Examiner*—Werner H. Schroeder
*Attorney*—Rommel & Rommel

[57] ABSTRACT

An inertia operated locking retractor in which angular acceleration of the spool upon which a safety belt is mounted causes a pawl to abut against a lock means in preventing further rotation of the spool and further unwinding of the safety belt therefrom.

2 Claims, 16 Drawing Figures

INVENTORS
Horst-Guenter Kirchhoff.
Peter Pfabe.
Gerhard Sedlmayr.
BY Rommel and Rommel
ATTORNEYS

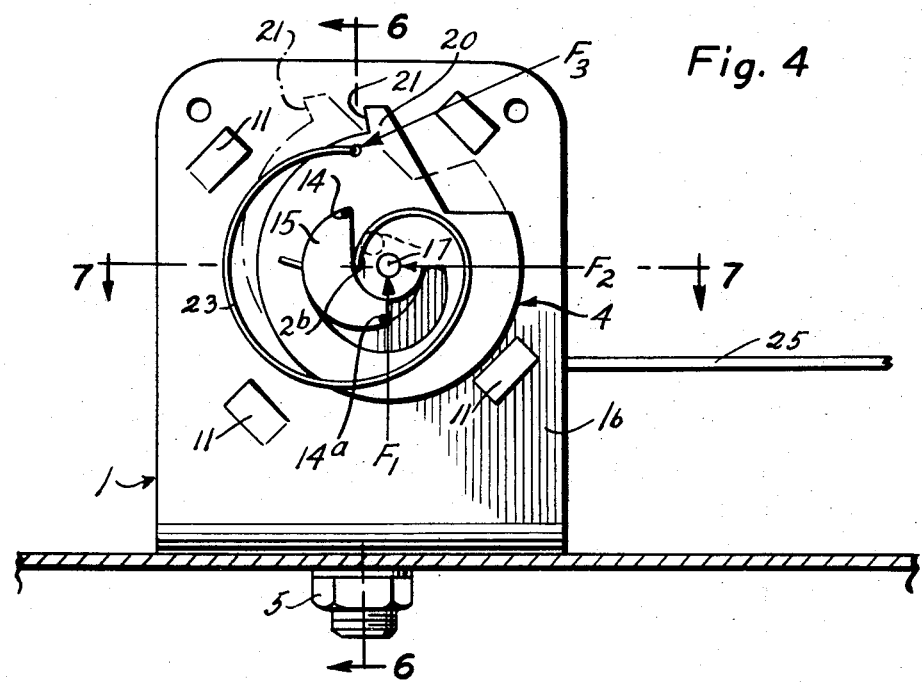
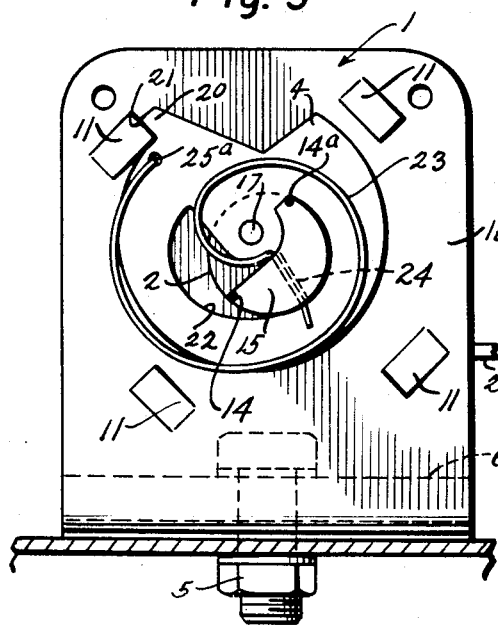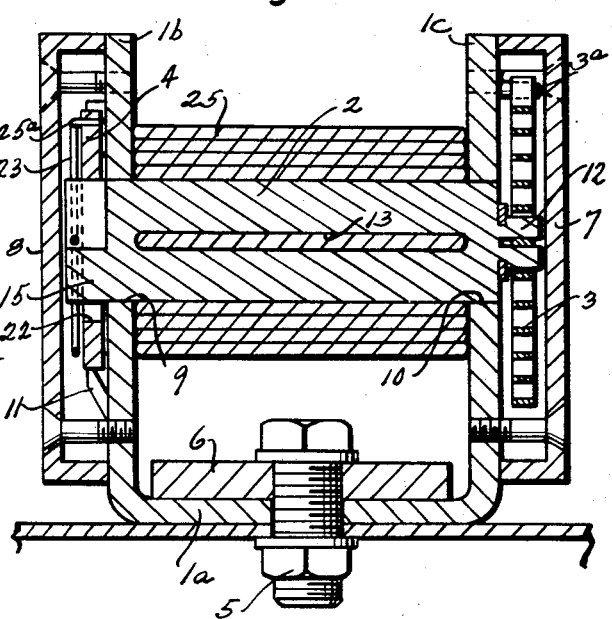

INVENTORS
Horst-Guenter Kirchhoff,
Peter Pfabe,
Gerhard Sedlmayr.
BY Rommel and Rommel
ATTORNEYS

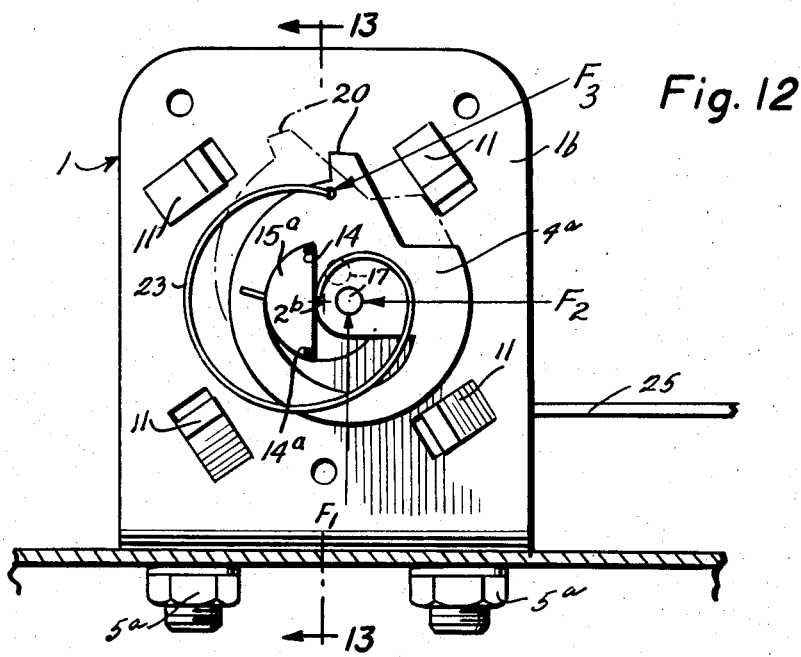
Fig. 12
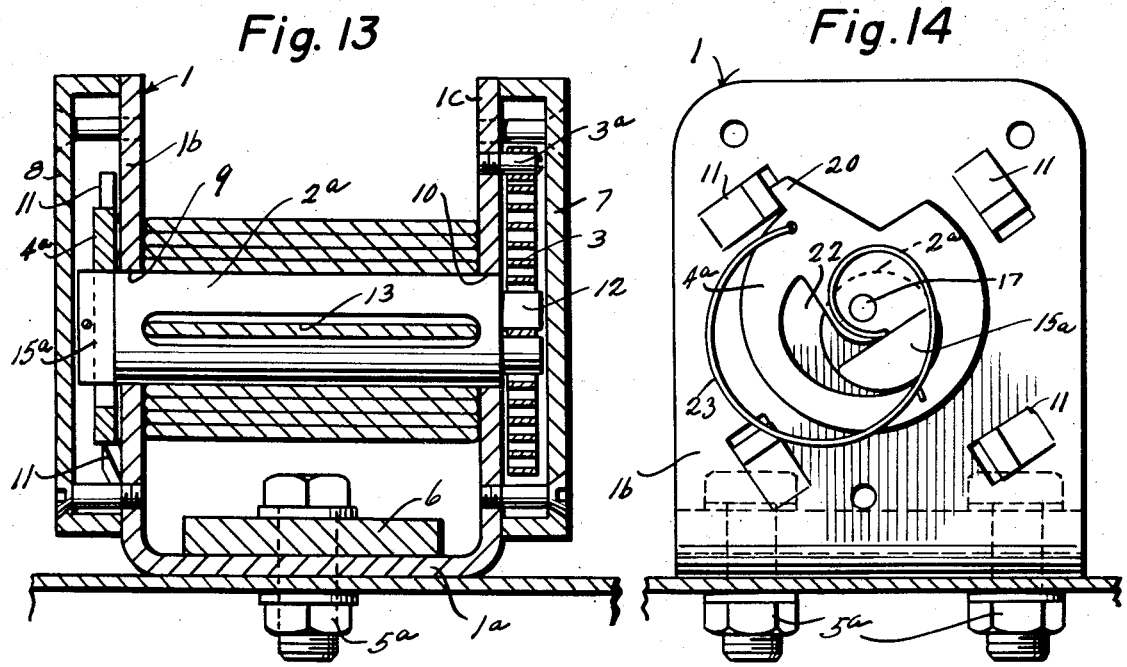
Fig. 13   Fig. 14
Fig. 15   Fig. 16
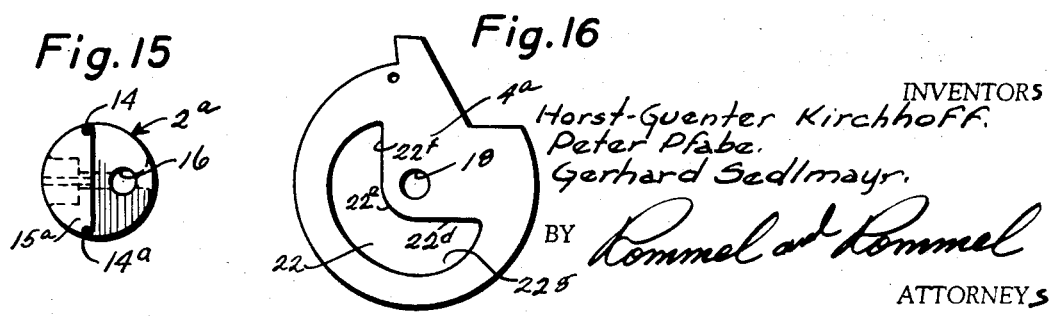
INVENTORS
Horst-Guenter Kirchhoff,
Peter Pfabe,
Gerhard Sedlmayr.
BY Rommel and Rommel
ATTORNEYS

INERTIA OPERATED LOCKING RETRACTOR

This invention is a continuation-in-part of our copending application Ser. No. 757,357, filed Sept. 4, 1968, now abandoned, and entitled "Belt Buckle Self-Locking Retractor." This application is a continuation-in-part insofar as the matter of operation of our inertia operated self-locking retractor was not fully understood at the time of filing of the aforementioned application and the present application sets forth the correct operational behavior of the same. It is to be noted that the present application includes the same structural configuration as that of the previous application.

This invention relates to improvement in inertia operated self-locking retractors.

Previously provided inertia operated locking retractors have included a variety of cam and follower devices necessary to operation thereof. Our improved retractor does away completely with the necessity of a cam-follower operational relationship and provides a simplified construction that is directly operable on angular acceleration of the spool in unwinding of a safety belt therefrom, without intermediate action through some rotative cam and follower relation.

Other objects and advantages of the invention will become apparent during the course of the following detailed description, taken in connection with the accompanying drawings, forming a portion of this specification, and in which drawings:

FIG. 4 is a side elevation of the retractor mechanism, with the side cover removed, showing the pawl in position for normal rotation and as a system with the spool and including a showing of force vectors which act upon the pawl under different conditions of rotation, the dot and dash lines showing the pawl in the position it may assume an instant after increased angular acceleration of the spool.

FIG. 5 is a view of the parts as shown in FIG. 4, but showing the retractor locked against further rotation, preventing further unwinding of the belt therefrom.

FIG. 6 is a transverse sectional view taken substantially on the line 6—6 of FIG. 4.

Figure 1:
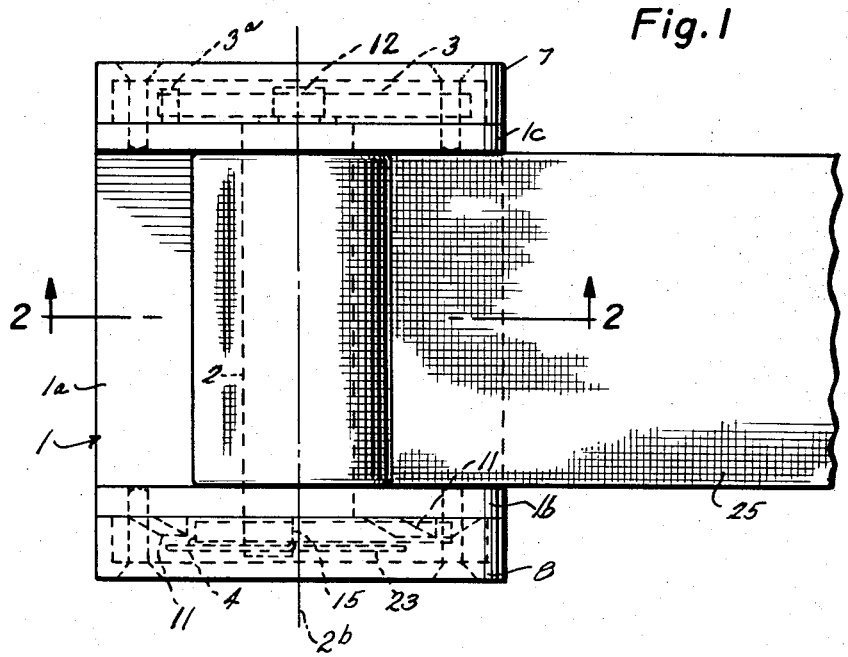
FIG. 1 is a plan view of the retractor mechanism, showing a belt partly extended.

FIG. 12 is a side elevation of a modified form of mechanism, with the side cover removed, showing the pawl in position for normal rotation as a system with the spool, and including a showing of force vectors which act upon the pawl under different conditions of rotation, the dot-and-dash lines showing the pawl in the position it may assume an instant after increased angular acceleration of the spool.

FIG. 13 is a transverse cross sectional view taken substantially on the line 13—13 of FIG. 12.

FIG. 14 is a view similar to FIG. 12, but showing the locked position of the modified retractor, which prevents further extension of the belt therefrom.

FIG. 15 is an end view of the spool of the form of FIG. 12.

FIG. 16 is a side elevation of the locking pawl of the modified form of invention.

In the drawings, wherein for the purpose of illustration are shown preferred and modified embodiments of the invention, and wherein similar reference characters designate corresponding parts throughout the several views, our improved inertia operated locking retractor preferably includes a frame 1, a retractor spool 2, retractor spring 3, and pawl 4. Bolt 5, in union with a reinforcing plate 6, serves to secure frame 1 at a suitable position upon a vehicle. Retractor spring 3 and the locking mechanism of the retractor may be provided with lids or covers 7 and 8, respectively, secured onto frame 1.

Frame 1 preferably comprises a piece of rigid sheet metal bent into a U-shape and having a base $1^a$ and two right angled spaced legs $1^b$ and $1^c$. Openings 9 and 10 are provided approximately in the middle of each leg $1^b$ and $1^c$. Openings 9 and 10 serve as seats or bearings for the ends of retractor spool 2, supporting spool 2 for rotation about an axis $2^b$. Frame 1 preferably includes a lock means which may comprise four rigid teeth 11 that may be provided in a spaced apart position on an outward side of leg $1^b$ of the frame. Teeth 11 are preferably arranged symmetrically along the circumference of an imaginary circle drawn about the center of opening 9, as shown in FIG. 4. Teeth 11 may be formed out of sheet metal sections pressed out of the plane of leg $1^b$ on the outer side thereof. These teeth 11, as shown in dotted lines in FIG. 1, have sloping outer faces and pawl engaging faces projecting at right angles to the outer side surface of the frame leg $1^b$.

Figure 2:
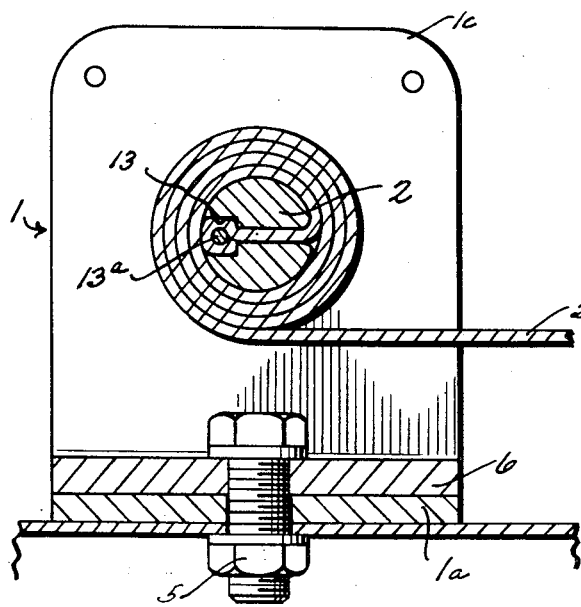
FIG. 2 is a cross sectional view taken substantially on the line 2—2 of FIG. 1.
Figure 3:
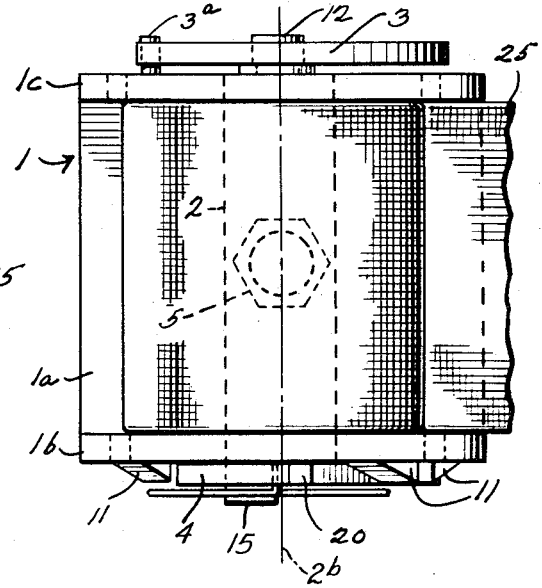
FIG. 3 is a top plan view of the retractor with its side covers removed.
Figure 7:
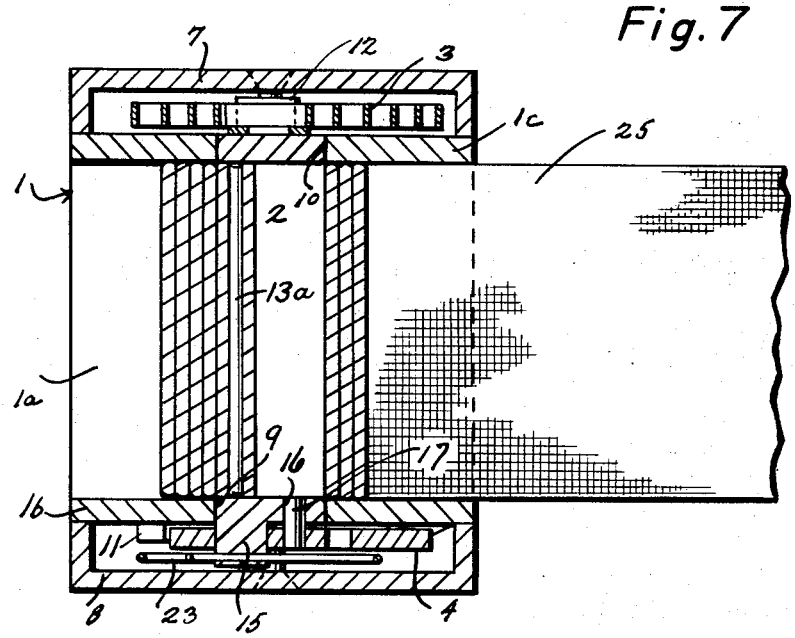
FIG. 7 is a horizontal cross sectional view taken substantially on the line 7—7 of FIG. 4.
Figure 8:
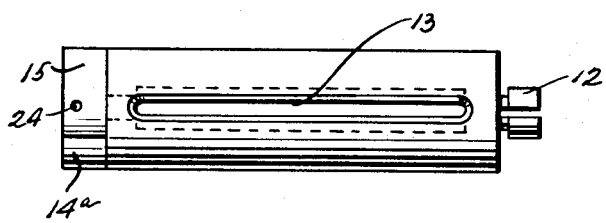
FIG. 8 is a plan view of the retractor spool.
Figure 9:
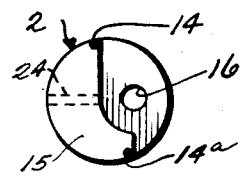
FIG. 9 is an end view of the spool, showing the end thereof upon which a pawl may be pivotally mounted.

Spool 2 is longer than the space between legs $1^b$ and $1^c$ and projects on each end over the outer sides of the legs. The projecting end 12 of spool 2 is provided with a cross slot for receiving the inner end of a curved spiral type flat spring 3. The outer end of spring 3 is attached at $3^a$ to frame leg $1^c$, as shown in FIG. 1. Spring 3 exerts its force in such a way that spool 2 tends to turn in the direction of belt retraction (clockwise in FIG. 2). The belt may have a doubled end which is attached to the spool 2 in a slot 13 by means of a clamping member $13^a$ and can be reeled from the spool against resistance of spring 3.

The other end of spool 2 has a projecting segment 15 which extends beyond the outer side of frame leg $1^b$. It has been found to be convenient to have segment 15 in the shape of a segment of a cross section of spool 2. Segment 15 is preferably of a dimension to cooperatively interact with pawl 4 in providing a stop 14 to limit rotation of the spool with respect to the pawl in one direction of travel and a stop $14^a$ to limit rotation of the spool with respect to the pawl in the other direction of travel. In the form of invention herein shown, the stop points 14 and $14^a$ are at spaced apart ends of the segment 15, in a manner to cooperate with the pawl, as will be subsequently described. However, it is obvious that a pawl-spool configuration may be provided leaving only a single stop point.

The end of spool 2 having segment 15 is provided with an aperture 16, eccentrically of the axis of rotation of the spool. Aperture 1y may receive a pin 17 which serves as pivot means for attachment of pawl 4 to spool 2.

Figure 10:
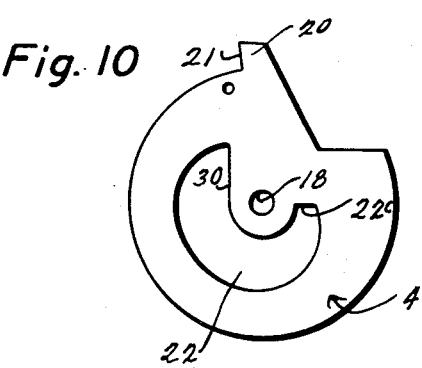
FIG. 10 is a side elevation of the locking pawl of our inertia retractor.
Figure 11:
FIG. 11 is an edge elevation of the pawl of FIG. 10.

Pawl 4, as shown in FIGS. 10 and 11, preferably comprises a non-rusting precision casting on a stamped tempered chromed metal sheet. The basic form of pawl 4 is circular, having an opening 18 which may receive pin 17. Pawl 4 may have an extension leg 20 having an edge 21 which provides a pawl stop which, under certain conditions of operation, abuts against teeth 11.

Pawl 4 may be provided with a curved slot or cut-out portion 22 whose shape may roughly correspond to the form of segment 15 of spool 2, cut-out 22 having a stop limit portion 30 which is positioned for abutment with the end of segment 15 having stop point 14, under certain conditions of operation, and a stop limit $22^c$ at the other end thereof, positioned for abutment with the end of segment 15 having stop point $14^a$ under other conditions of operation.

The manner in which pawl 4 is mounted on the spool end is best shown in FIG. 4. As shown, the axis $2^b$ of spool 2 is spaced from the axis of pin 17, so that disc 4 is pivoted eccentrically on spool 2. Spool 2 and pawl 4 may be interconnected by a tensioned wire spring 23. The inside end of spring 23 may project into a transverse passageway or bore 24 of spool 2, while the outside end thereof engages in opening $25^a$ of disc 4, in the vicinity of pawl extension leg 21. The tension of spring 23 exerts a force $F_3$ thereagainst, as shown in FIG. 4.

Pawl 4 is preferably designed so that it is dynamically balanced around pin 17. This means that a force applied in any direction at pin 17, planar to the pawl, will not cause the pawl to rotate about pin 17. Pawl 4 is free to rotate about pin 17, but its degree of rotation is limited such as by stop points 14 and $14^a$ of segment 15.

There are three separate conditions that influence the motion of the pawl. They are:

1. Angular acceleration of spool 2 about its axis
2. Constant angular velocity (zero acceleration) of spool 2 about its axis $2^b$.
3. At rest.

Under condition (1), there is imposed a tangential force $F_1$ acting on pawl 4 whenever shaft 2 is subjected to an angular acceleration. If pawl 4 were not restricted to a circular path by attachment to spool 2 by pin 17, pawl 4 would move horizontally to the left without rotation. However, since movement of pawl 4 is restricted to a circular path about spool axis $2^b$, the pawl will, under conditions of angular acceleration of spool 2, move to a position as shown in dot-and-dash lines in FIG. 4 (without any substantial rotation about pin 17). The total pawl-shaft system then rotates about spool axis $2^b$ until pawl extension leg 21 moves into abutment with a tooth 11, as shown in FIG. 5. Upon abutment of pawl extension leg 21 with a tooth 11, rotation of the pawl about axis $2^b$ will stop and extension 15 of spool 15 will move through groove 22 until stop point $14^a$ thereof abuts against end $22^c$, whereupon further rotation of spool 2 will be prevented.

As previously stated, pawl 4 is dynamically balanced about pin 17. Accordingly, centrifugal force $F_2$, which may be present due to angular velocity of the spool, will be through axis $2^b$ and pin 17. Force $F_2$ is acted upon in an equal and opposite direction by the pin 17 which cancels any effect of resultant force $F_2$ on the motion of the pawl.

Under an at rest condition, spring bias is provided through spring 23 to place the pawl in an initial at rest position prior to acceleration. This spring force is applied in a tangential direction as shown by vector $F_3$, acting on pawl 4 through spring 23.

It is obvious that, under conditions of angular acceleration, force $F_2$ must be sufficient to overcome force $F_3$ before pawl 4 will move relative to spool 2. Since force $F_2$ is proportional to the angular acceleration, the level of angular acceleration required to cause pawl 4 to move relative to spool 2 can be controlled by the amount of spring force ($F_3$) acting on pawl 4 through spring 23.

Thus, when in an at rest position, and under conditions of angular acceleration which are not sufficient to overcome the force ($F_3$) of spring 23, such as in slowly unwinding of the belt from spool 2 in attachment of the same about the waist of the occupant, or such as by leaning forward to reach something in the glove compartment, pawl 4 will remain in the position as shown in solid lines in FIG. 4. Under conditions of extreme angular acceleration, such as in the case of a collision or hard braking of the vehicle, angular acceleration will cause exertion of a force $F_1$ which is sufficient to overcome the limiting action of force $F_3$, causing pawl 4 to move to a position as shown in dot-and-dash lines in FIG. 4. Upon continued rotation of spool 2, edge 21 of pawl extension leg 20 will abut against a tooth 11, as shown in FIG. 5, stopping rotation of spool 2 and preventing any further unwinding of belt 25. When force $F_1$ is removed, such as when the vehicle comes to a stop, spring 3 will cause at least partial rewind of the belt so that edge 21 of pawl leg 20 can move away from adjacent tooth 11 and spring 23 will cause pawl 4 to rotate about pin 17 to a normal position of rotation with spool 2, as shown in solid lines in FIG. 4.

The modified form of invention as shown in FIGS. 12–16 is intended to show that the configuration of the stop means provided on spool 2, which cooperates with the pawl such as by providing stop points 14 and $14^a$, is not critical and that the pawl itself may be designed with different forms of grooves for receiving such stops. So far as applicable, the same reference characters used in describing the first form of the invention have been used in describing the modified form.

Essentially, the modified form of retracting device consists of a U-shaped frame 1 supporting the individual parts, including spool $2^a$, a retracting spring 3, and pawl $4^a$. Two bolts $5^a$ instead of one may be used to bolt the base $1^a$ of the modified form to the vehicle frame.

On the side on which pawl $4^a$ is to be mounted, spool $2^a$ may again include a segment of a cross section of the spool itself. In the modified form the segment is much smaller than segment 15 of the first form of invention.

Pawl $4^a$, as shown in detail in FIG. 16, has a basically circular shape including an opening 18 for receiving pivot pin 17 for mounting the same eccentrically on spool $2^a$. Pawl $4^a$ may be provided with a groove 22 having a stop end $22^f$ for abutment with the end of segment $15^a$ having stop point 14 and a stop end $22^d$ for abutment with the end of segment 15$^a$ having a stop point 14$^a$.

As shown in FIG. 12, force vectors exerted upon this form of the invention are substantially identical to those as previously specified in connection with the first form of invention. In this FIG. 12, pawl 4$^a$ is shown in dot-and-dash lines in the position which it will assume at or shortly after increased angular acceleration of spool 2$^a$. The locked position of pawl 4$^a$ is shown in FIG. 14.

Various changes in the shape, size and arrangement of parts may be made to the forms of the invention herein shown and described without departing from the spirit of the invention or the scope of the following claims.

I claim:

1. In a self-locking retractor mechanism, the combination of a supporting frame, a spool rotatably mounted on said frame, said spool including a projecting segment, a flexible belt for winding and unwinding with respect to said spool, a spring biased to normally wind the belt upon said spool, said frame having lock means, a pawl having a body portion including an extended portion positioned for cooperation with said lock means, said body portion of said pawl including a shaped slot having stop limit portions, and a pivot pin attached to one end of said spool, said pawl being pivotally mounted on said pivot pin with said segment of said spool movably interfitting within said shaped slot of said pawl for interengagement therewith, said pawl being dynamically balanced about said pivot pin for normal rotation as a system with said spool about the axis of rotation of said spool, said pivot pin being disposed eccentric of the axis of rotation of said spool so that angular acceleration of said spool on unwinding of said belt therefrom imposes a tangential force on said pawl and displaces said pawl from normal rotation with said spool, interengagement of said segment with said shaped slot comprising guide means for regulating displacement of said pawl with respect to said spool and guiding said pawl to a position whereby said extended portion of said pawl engages said lock means, engagement of said extended portion of said pawl with said lock means stopping rotation of said pawl, interengagement of said segment with said stop limit portion of said slot comprising stop means to conjunctively stop rotation of said spool and prevent further unwinding of said belt therefrom.

2. A self locking retractor mechanism as specified in claim 1 wherein said segment comprises a segment of a cross section of said spool and spring means is provided to bias said pawl for normal rotation thereof as a system with said spool.

* * * * *